(12) United States Patent
Taniguchi et al.

(10) Patent No.: US 11,864,625 B2
(45) Date of Patent: Jan. 9, 2024

(54) SHOE SOLE AND METHOD FOR MANUFACTURING SOLE

(71) Applicant: ASICS CORPORATION, Hyogo (JP)

(72) Inventors: Norihiko Taniguchi, Hyogo (JP); Shigeru Hibino, Gifu (JP); Yutaro Iwasa, Hyogo (JP)

(73) Assignee: ASICS CORPORATION, Hyogo (JP)

( * ) Notice: Subject to any disclaimer, the term of this patent is extended or adjusted under 35 U.S.C. 154(b) by 708 days.

(21) Appl. No.: 16/468,293

(22) PCT Filed: Dec. 22, 2016

(86) PCT No.: PCT/JP2016/088491
§ 371 (c)(1),
(2) Date: Jun. 11, 2019

(87) PCT Pub. No.: WO2018/116463
PCT Pub. Date: Jun. 28, 2018

(65) Prior Publication Data
US 2020/0068990 A1 Mar. 5, 2020

(51) Int. Cl.
*A43B 13/26* (2006.01)
*A43B 13/02* (2022.01)
(Continued)

(52) U.S. Cl.
CPC ............ *A43B 13/26* (2013.01); *A43B 13/026* (2013.01); *A43B 13/22* (2013.01);
(Continued)

(58) Field of Classification Search
CPC .. B29D 35/0054; B29D 35/142; A43B 13/26; A43B 13/026; A43B 13/22; A43B 17/00; A43B 13/023; A43B 13/12; A43B 13/00; C08J 5/04; B32B 2437/02; B32B 5/00; B29K 2101/12; A43C 13/12
USPC ........... 36/114, 126, 127, 128, 129, 134, 43, 36/59 R, 62, 67 A, 73, 74; 168/26, 14; 428/300.7
See application file for complete search history.

(56) References Cited

U.S. PATENT DOCUMENTS 5,091,125 A 2/1992 Harada et al.
2010/0028616 A1* 2/2010 Yamanouchi ......... B29C 43/003
428/172
(Continued)

FOREIGN PATENT DOCUMENTS

GB 2503945 A * 1/2014 ............. A43B 13/26
JP 2000-102402 4/2000
(Continued)

OTHER PUBLICATIONS

Machine Translation of Tournier (WO 02/087376 A1) from Google Patents (Year: 2002).*
(Continued)

*Primary Examiner* — Camie S Thompson
(74) *Attorney, Agent, or Firm* — JCIPRNET

(57) ABSTRACT

A sole of a shoe including: a first base including as its main component a first thermoplastic resin; a projection including as its main component the first thermoplastic resin, the projection projecting from the first base; and at least one first reinforcement fiber oriented while being bent from the first base toward the projection.

8 Claims, 14 Drawing Sheets

(51) Int. Cl.
  B29D 35/00    (2010.01)
  B29D 35/14    (2010.01)
  B32B 5/00     (2006.01)
  C08J 5/04     (2006.01)
  A43B 13/22    (2006.01)
  B29K 101/12   (2006.01)

(52) U.S. Cl.
  CPC ....... B29D 35/0054 (2013.01); B29D 35/142 (2013.01); B32B 5/00 (2013.01); C08J 5/04 (2013.01); B29K 2101/12 (2013.01); B32B 2437/02 (2013.01)

(56) References Cited

U.S. PATENT DOCUMENTS

| | | | |
|---|---|---|---|
| 2013/0333251 A1 | 12/2013 | Taniguchi et al. | |
| 2016/0003318 A1* | 1/2016 | Wood | A43B 23/07 267/141 |
| 2017/0006962 A1* | 1/2017 | Tanabe | A43B 13/386 |

FOREIGN PATENT DOCUMENTS

| | | |
|---|---|---|
| JP | 2001-87005 | 4/2001 |
| JP | 2002-125709 | 5/2002 |
| WO | 02087376 | 11/2002 |
| WO | WO-02087376 A1 * | 11/2002 ............ B60C 11/14 |
| WO | 2012/127556 | 9/2012 |
| WO | 2016/163393 | 10/2016 |

OTHER PUBLICATIONS

British Plastics Federation (BPF). "Thermoplastic Elatomers TPE, TPR". From Wayback Machine Archive https://web.archive.org/web/20150429181518/https://www.bpf.co.uk/plastipedia/polymers/thermoplastic_elastomers.aspx (Year: 2015).*
Madhu. "Difference Between Natural Rubber and Vulcanized Rubber". (Year: 2019).*
PK Mallick. Fiber-Reinforced Composites—1.3.4 Sporting Goods Applications & 2.2 Matrix, Third Edition, CRC Press. (Year: 2007).*
Asics. "A Step Toward Supporting Athletes Reach Top Performance—Full Carbon Spec Spike Short-Distance Shoes Developed". (Year: 2012).*
Asics. "A Step Toward Supporting Athletes Reach Top Performance—Full Carbon Spec Spike Short-Distance Shoes Developed" Retrieved from https://assets.asics.com/page_types/1671/files/20120515_original.pdf?1386146177 (Previously cited but re-uploaded to improve quality of NPL PDF) (Year: 2012).*
International Search Report Issued in PCT/JP2016/088491 dated Feb. 7, 2017.
"Search Report of Europe Counterpart Application", dated Nov. 11, 2019, p. 1-p. 7.

* cited by examiner (a)

(b)

(c)

SHOE SOLE AND METHOD FOR MANUFACTURING SOLE

CROSS-REFERENCE TO RELATED APPLICATION

This application is a 371 application of the International PCT application serial no. PCT/JP2016/088491, filed on Dec. 22, 2016. The entirety of the above-mentioned patent application is hereby incorporated by reference herein and made a part of this specification.

TECHNICAL FIELD

The present invention relates to a sole of a shoe having projections such as spikes and cleats, and a method for manufacturing such a sole.

BACKGROUND ART

By forming a sole from reinforcement fiber covered by a matrix resin, e.g., a pre-preg layer, it is possible to increase the rigidity of the sole and reduce the weight of the sole. Such reduction in the weight of the spike sole is important for football sports, etc., as well as for track-and-field spike shoes.

With soles with spike pins, it is well known in the art to form a sole from a layer of a sheet of the reinforcement fiber (the first to third patent documents). In recent years, a sole having honeycomb-shaped spikes has been proposed (the fourth patent document).

CITATION LIST

Patent Literature

[First Patent Document] JP2000-102402A (summary)
[Second Patent Document] JP2002-125709A (summary)
[Third Patent Document] WO2012/127556A1 (FIG. 2)
[Fourth Patent Document] WO2016/163393A1 (FIG. 1)

SUMMARY OF INVENTION

However, the spikes of these patent documents are made of metal. Such metal spikes need to be bonded to a resin-made sole. The metal spikes may possibly come off the sole.

Thus, it is an object of the present invention to provide a shoe sole, with which there is no need to bond projections such as spikes or cleats on the sole and the projections such as spikes or cleats are unlikely to come off the sole, and a method for manufacturing such a sole.

A sole of a shoe of the present invention includes:
a first base 11 including a first thermoplastic resin as a main component of the first base 11;
a projection 2 including the first thermoplastic resin as a main component of the projection 2, the projection 2 projecting from the first base 11; and
at least one first reinforcement fiber F2 oriented while being bent from the first base 11 toward the projection 2.

According to the present invention, the projection projecting from the first base includes as its main component the same first thermoplastic resin as the first base. There will be no need to bond projections such as spikes or cleats to the sole, and the projections will be unlikely to come off the sole.

Particularly, the first reinforcement fiber is oriented while being bent from the first base toward the projection, thereby reinforcing an area at the base of the projection. While a great moment acts upon the base area while running, the first reinforcement fiber will serve as a great reaction force against the moment. This will therefore improve the strength of the area at the base of the projection.

In the present invention, projections also include thorn-like small projections as well as spikes and cleats.

As used herein "as its main component" means that the thermoplastic resin component at least has a greater quantity (greater weight) than other resin components. The weight ratio of the thermoplastic resin component, which is the main component, is preferably 50 to 100 wt %, more preferably 60 to 100 wt %, and most preferably 70 to 100 wt %, of the entire resin component of the first base and the projections.

Where the first base and the projections on the ground side or the first base on the foot side are laminated with a second resin, it is necessary to determine whether or not it is the main component while excluding the second resin.

The type of the first thermoplastic resin may be a thermoplastic polyamide resin, a urethane resin, an epoxy resin, a polypropylene resin, or the like, for example. One resin component may be used alone, or two or more may be used in combination.

In the present invention, for example, a carbon fiber, a boron fiber, an aramid fiber, a glass fiber, or the like, may be employed as the reinforcement fiber. One reinforcement fiber may be employed, or two or more may be employed.

The first reinforcement fiber and the second reinforcement fiber may be of the same type or may be of different types from each other.

Figure 4:
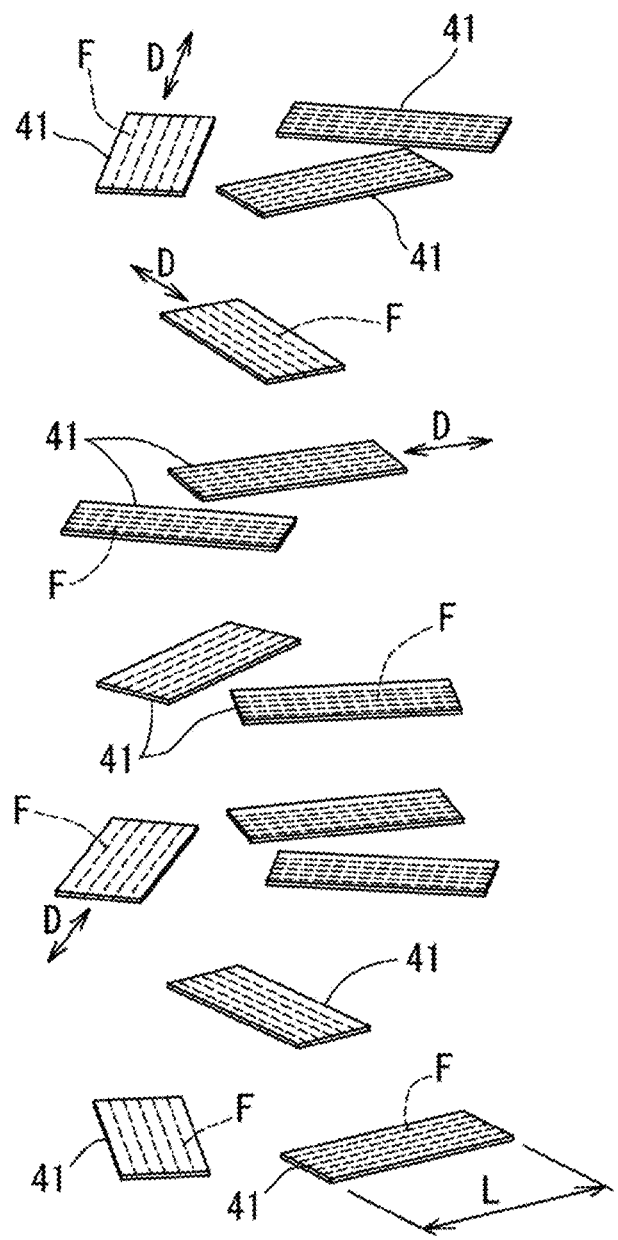
FIG. 4 is a conceptual exploded perspective view showing, exploded, a portion of a resin plate.
Figure 5:
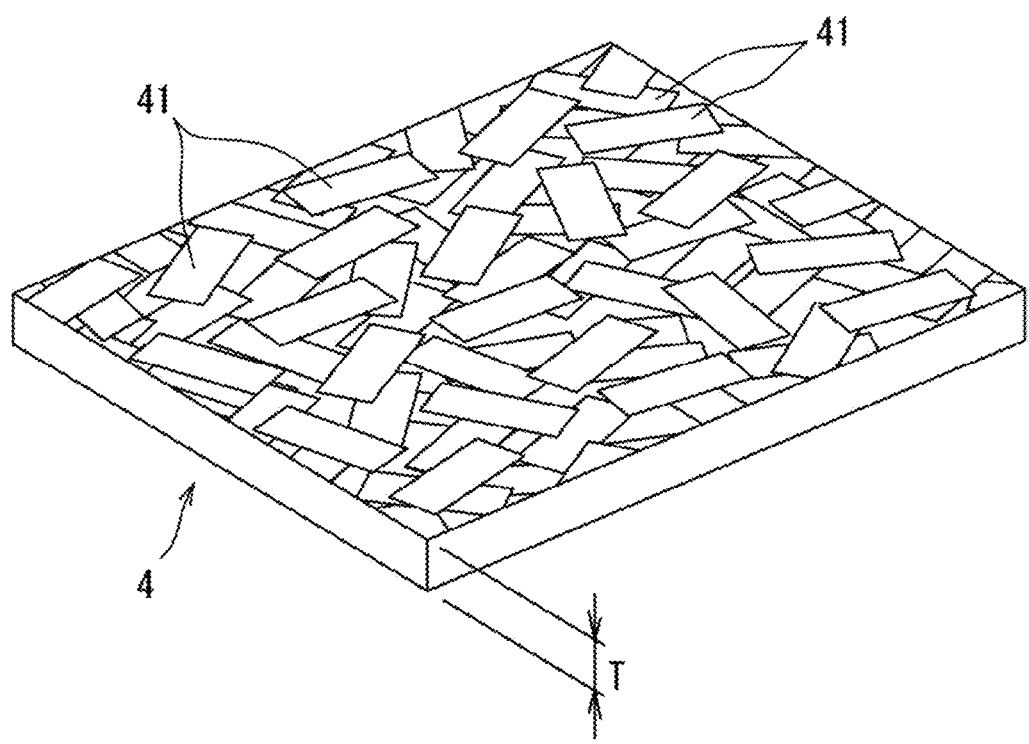
FIG. 5 is a perspective view showing an example of a resin plate.

Although a plurality of resin pieces, as molded into a resin plate, bend over one another, the resin pieces are shown in FIG. 4 and FIG. 5 to be flat plate-shaped for the sake of simplicity of the drawing.

Figure 6:
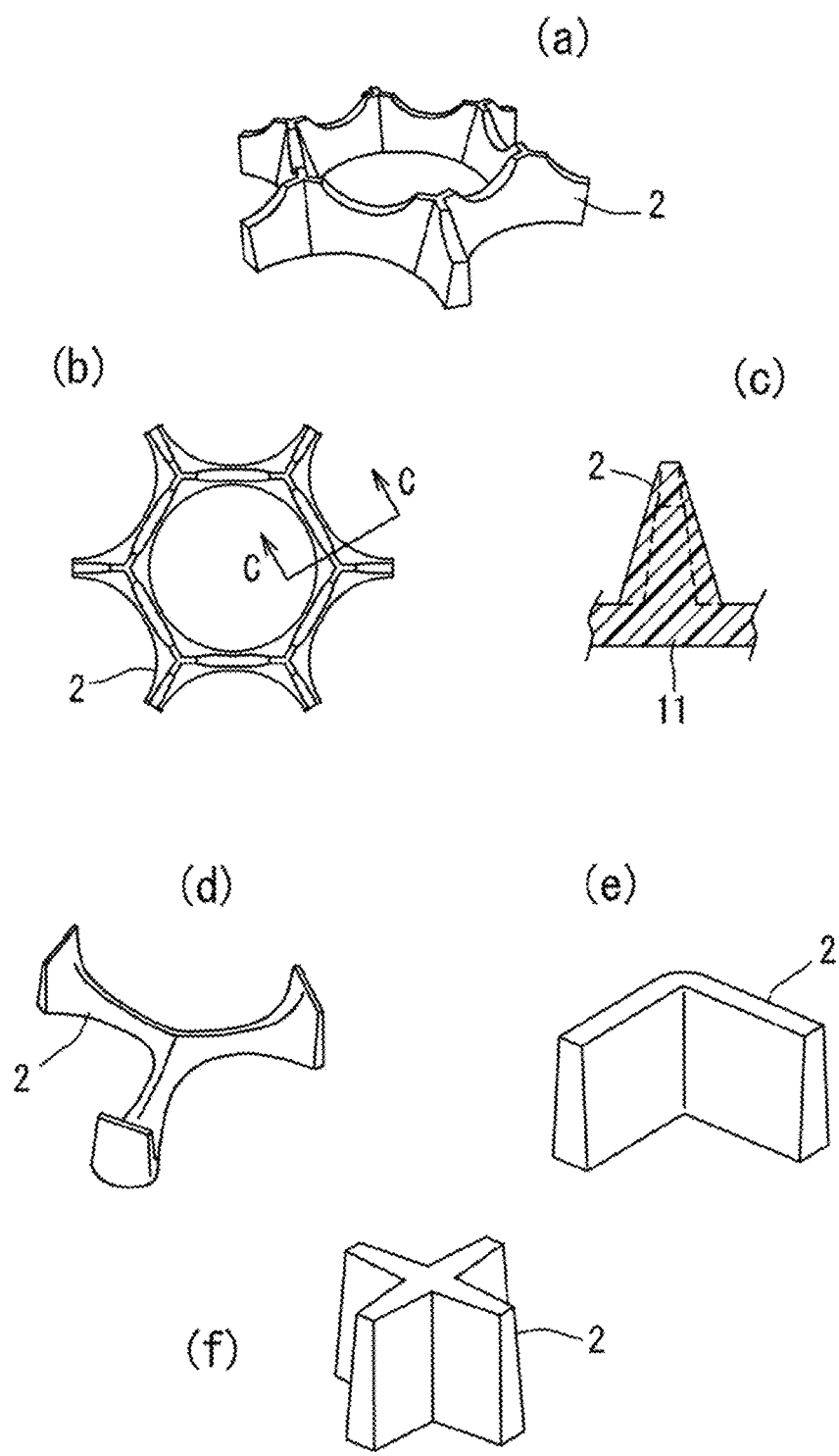

FIG. 6 shows examples of shapes of a projection, wherein (a), (b) and (c) are an enlarged perspective view, a plan view and a cross-sectional view, respectively, showing another example, and (d) to (i are enlarged perspective views showing still other examples.

Figure 7:
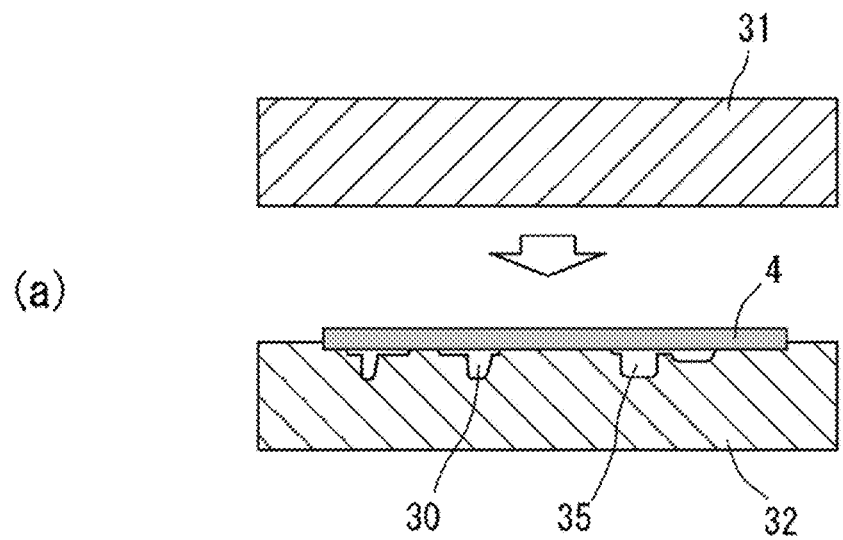
Figure 7:
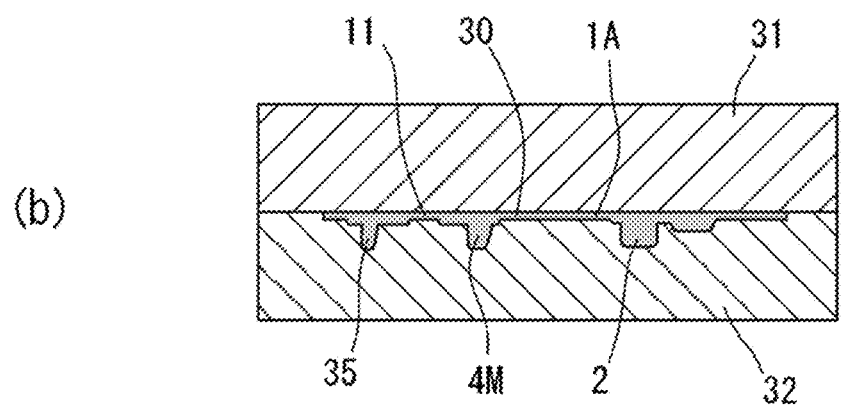
Figure 7:
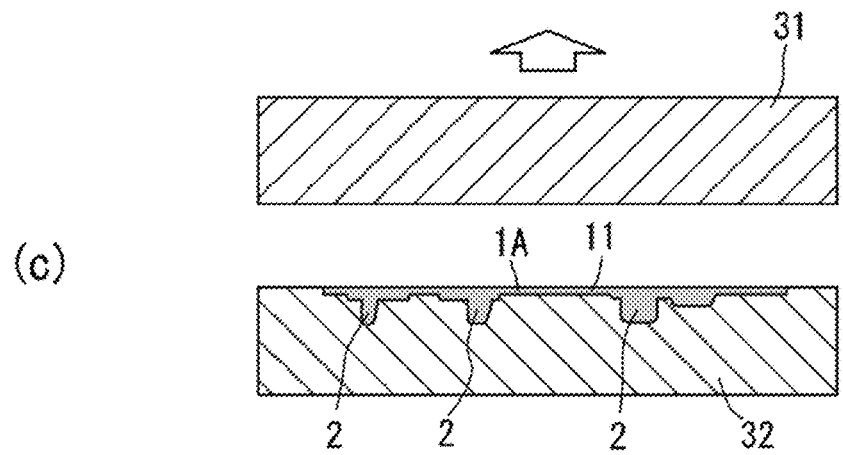

FIG. 7 is cross-sectional views of one embodiment of a manufacturing method, showing steps of producing a first portion.

Figure 8:
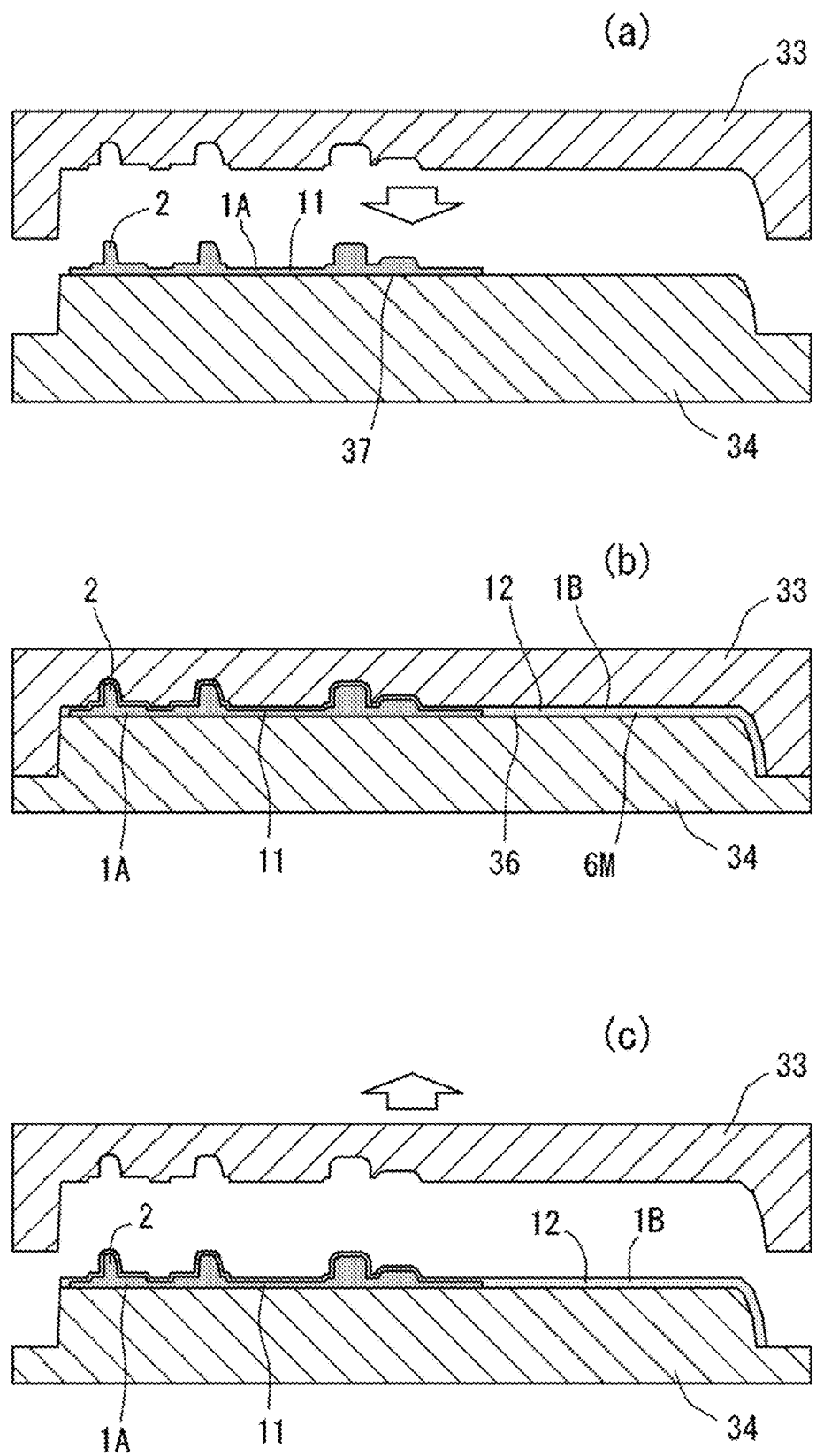

FIG. 8 is cross-sectional views showing steps of producing a second portion.

In FIG. 7 and FIG. 8, areas of the first and second thermoplastic resins are shown in gray in order to make these portions conspicuous.

Figure 9:
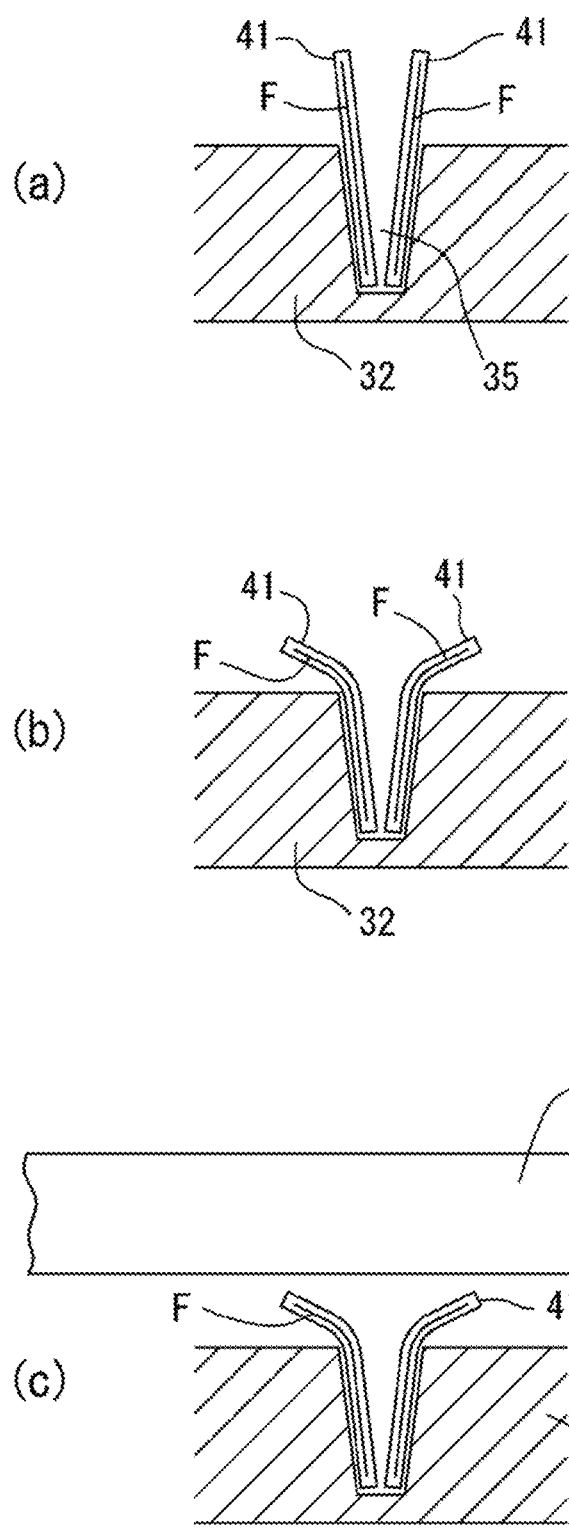

FIG. 9 is cross-sectional views showing additional steps of another manufacturing method.

Figure 10:
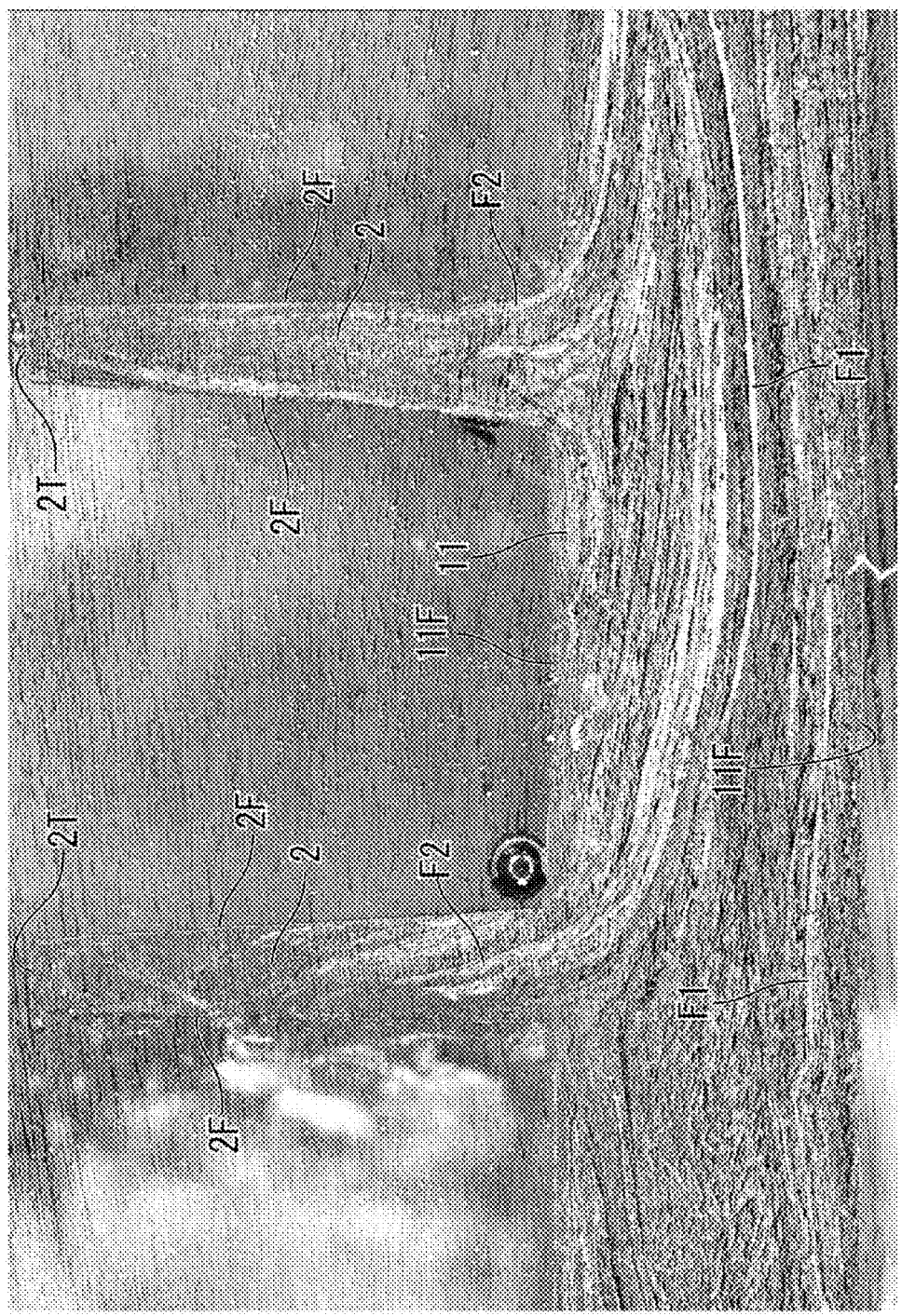

FIG. 10 is an enlarged cross-sectional view showing, in a digital picture, Test Sample 1 of a structure of the first base and a projection of the present invention.

Figure 11:

FIG. 11 is an enlarged cross-sectional view showing, in a digital picture, Test Sample 2 of a structure of the first base and a projection of the present invention.

Figure 12:
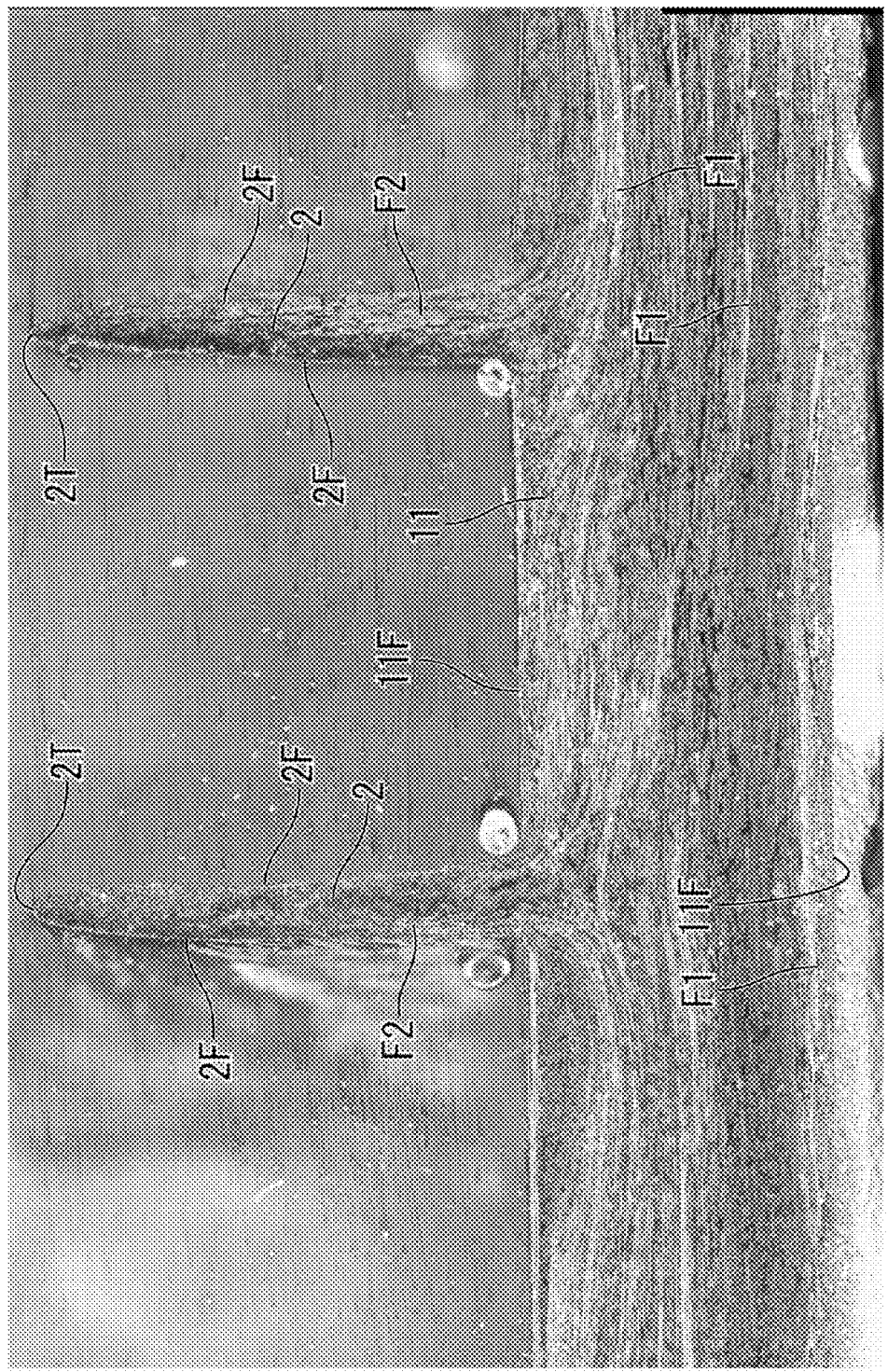

FIG. 12 is an enlarged cross-sectional view showing, in a digital picture, Test Sample 3 of a structure of the first base and a projection of the present invention.

In FIG. 10, FIG. 11 and FIG. 12, the average thickness of the projection is 0.4 mm, 0.3 mm and 0.2 mm, respectively.

Figure 13:
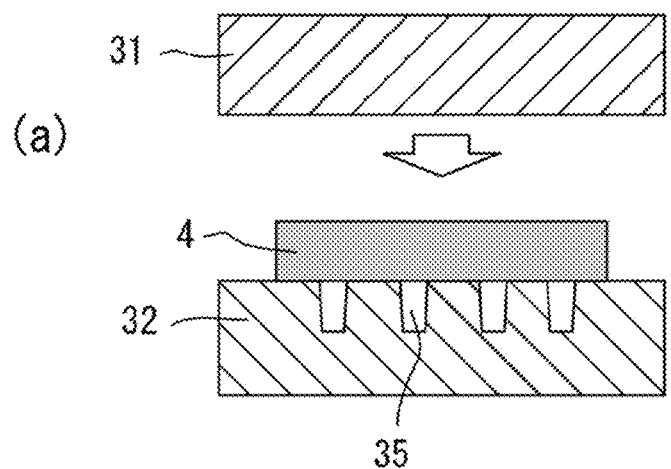
Figure 13:
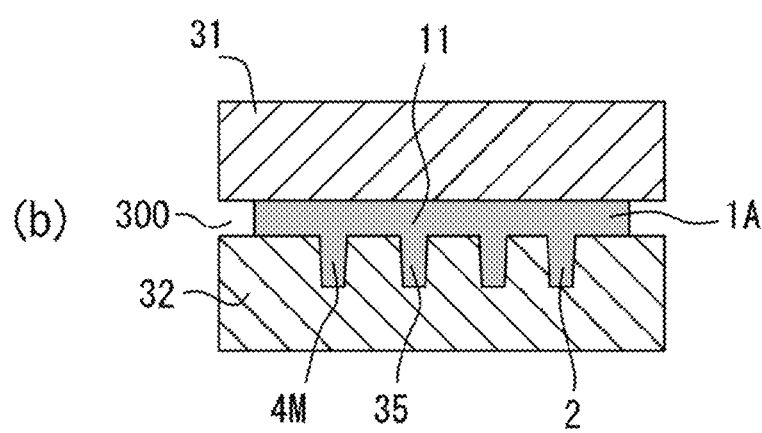
Figure 13:
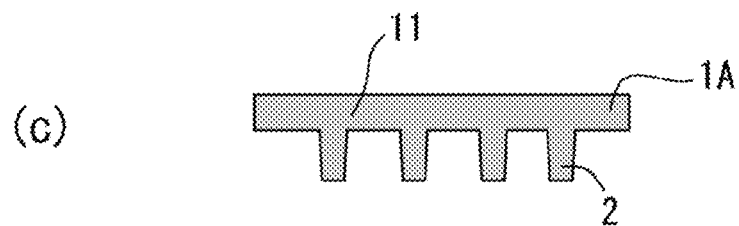

FIG. 13 is a schematic cross-sectional view of another embodiment of a manufacturing method, showing steps of producing a first portion.

Figure 14:
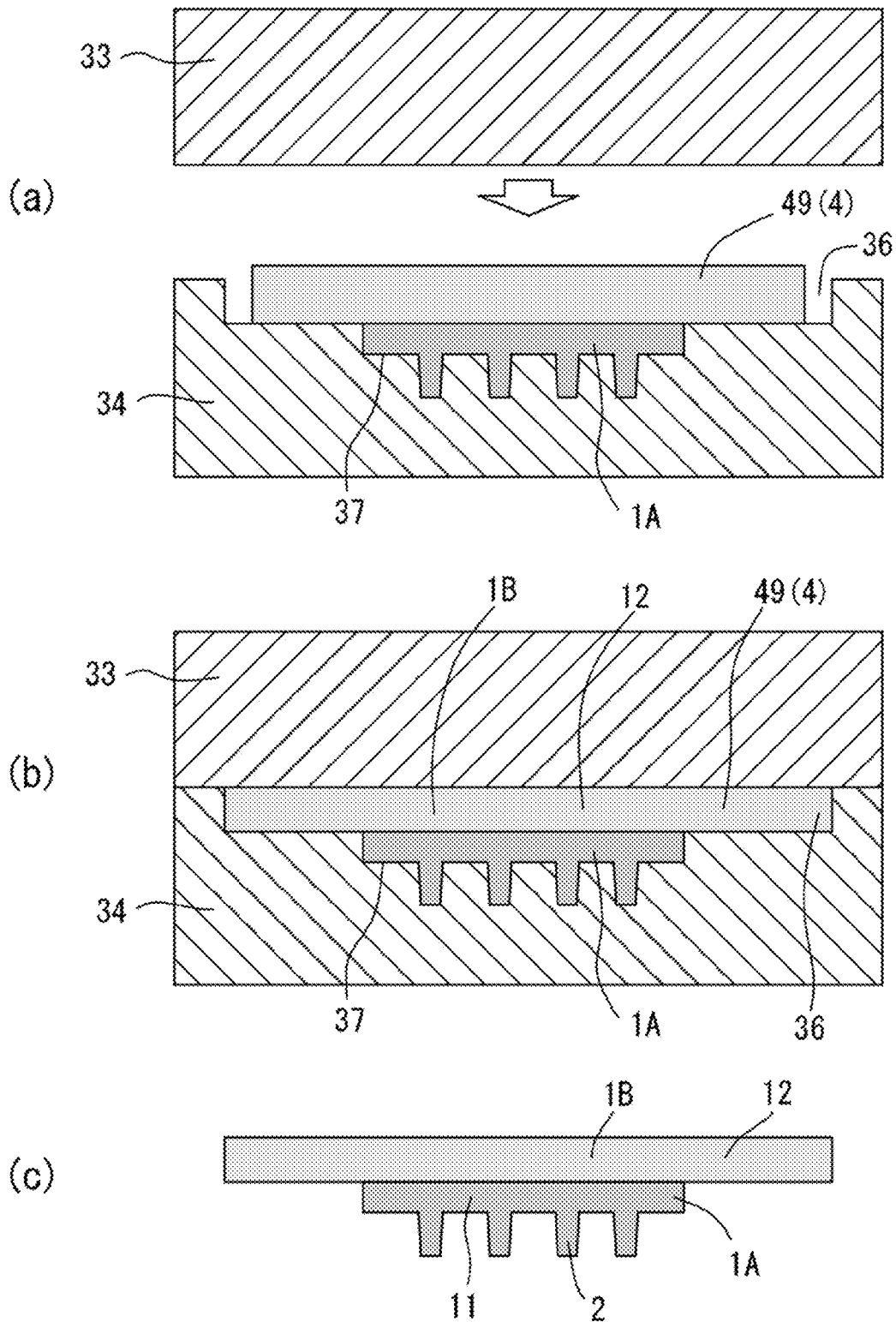

FIG. 14 is a schematic cross-sectional view showing steps of producing a second portion.

In FIG. 13 and FIG. 14, areas of the first and second thermoplastic resins are shown in gray in order to make these portions conspicuous.

DESCRIPTION OF EMBODIMENTS

Preferably, the sole of a shoe further includes at least one second reinforcement fiber F1 buried in the first base 11.

Thus, it is possible to further reinforce the first base.

Preferably, at least four layers of reinforcement fiber including the first reinforcement fiber F2 are buried at least in a corresponding area 11$p$ of the first base 11 that corresponds to the projection 2; and at least in the corresponding area 11$p$, the four layers of reinforcement fiber extend in a direction in which the first base 11 extends and are oriented in at least four different directions.

More preferably, many, four to fifty, layers of reinforcement fiber including the first reinforcement fiber F2 are buried at least in a corresponding area 11$p$ of the first base 11 that corresponds to the projection 2; and at least in the corresponding area 11$p$, the many layers of reinforcement fiber extend in a direction in which the first base 11 extends and are oriented in at least four different directions.

In these cases, the four layers of reinforcement fiber oriented in four different directions reinforce the corresponding area 11$p$ of the first base. This will therefore further increase the strength of the proximal portion of the projection upon which a great bending moment acts.

Depending on the type of the sole, there are various projection shapes and projection arrangements. In contrast, where the four layers of reinforcement fiber arranged in the corresponding area 11$p$ are oriented in four different directions, the proximal portion will be reinforced with a high reliability even with the various projection shapes and arrangements.

Where the layers of reinforcement fiber are oriented only in one to three directions, there may not be a sufficient reaction force against bending moments in various directions acting upon projections. Also, there may not be a sufficient reaction force against bending moments and torsional moments acting upon the first base.

In contrast, with the four layers of reinforcement fiber being oriented in four different directions, reaction forces against the aforementioned moments will likely be exerted. Note that with the four layers of reinforcement fiber being oriented in four different directions, quasi-isotropy will likely be exerted. On the other hand, with one to three layers of reinforcement fiber being oriented in one to three directions, it is difficult to exert quasi-isotropy.

On the other hand, when the number of layers of reinforcement fiber is too large, the first base will be unnecessarily thick. That may detract from the flexibility and the lightweightness needed for the sole. In view of the above, the number of layers of reinforcement fiber is preferably 50 or less.

The "corresponding area" as used herein means to at least include the projected area obtained as the projection is projected (reflected) in the direction normal to the surface of the sole. The "corresponding area" can be said to mean to at least include the proximal portion of the projection 2 on the first base 11.

Preferably, the sole of a shoe further includes a second base 12 including, as a main component of the second base 12, a second thermoplastic resin that is different from the first thermoplastic resin or including the first thermoplastic resin as a main component of the second base 12, wherein at least a second base 12 is arranged in a non-corresponding area 12$p$ excluding a corresponding area 11$p$ corresponding to the projection 2 and is continuous with the first base 11.

The sole is required to have an appropriate rigidity and flexibility depending on each area. In contrast, as the second base including as its main component the second thermoplastic resin is provided in the non-corresponding area, it is likely that the sole has an appropriate rigidity and flexibility depending on each area.

Now, polyurethane, polyamide, or the like, may be employed, for example, as the second thermoplastic resin.

The second thermoplastic resin of the second base may be provided other than in the non-corresponding area, and it may be laminated on the corresponding area of the first base and the ground side of the projections, for example. In such a case, the abrasion resistance of the ground side surface may be improved. The foot side of the first base may be laminated on the second base. In such a case, the strength of the sole will be improved.

Preferably, a length L of the first reinforcement fiber F2 is greater than a height H of the projection 2.

In such a case, the first reinforcement fiber F2 can be arranged from the proximal portion to the distal portion of the projection 2, and it will make it easier to reinforce the projection itself.

Preferably, a length L of the first reinforcement fiber F2 is 5 to 60 mm.

Where the length of the first reinforcement fiber F2 exceeds 60 mm, the fluidity of the first reinforcement fiber F2 when being molded is small even if the matrix resin softens, and the first reinforcement fiber F2 may be unlikely to move into the projections.

On the other hand, where the length of the first reinforcement fiber F2 is shorter than 5 mm, it is likely that the first reinforcement fiber F2 is not arranged to extend from the first base to the distal portion through the proximal portion. In such a case, it may not be possible to sufficiently increase the bending stiffness of the projection.

The height of a spike or a cleat is typically between 2 to 3 mm and 10-plus mm. In view of the above, the length of the first reinforcement fiber F2 is more preferably about 10 to 50 mm, and most preferably about 15 to 40 mm.

On the other hand, while there is no particular limitation on the thickness (diameter) of the first reinforcement fiber F2 and the second reinforcement fiber F1, it is preferably about 3 to 20 μm, more preferably about 4 to 15 μm, and most preferably about 5 to 10 μm.

Preferably, the average thickness of the projection 2 is 0.35 mm to 20 mm.

When the average thickness of the projection is smaller than 0.35 mm, the first reinforcement fiber F2 is unlikely to move into the projection, and a sufficient reinforcement is unlikely. On the other hand, when the average thickness of the projection is greater than 20 mm, the projection will in many cases have a sufficient strength without reinforcement with the first reinforcement fiber F2.

A manufacturing method of the present invention uses a first mold (die) 31 and a second mold 32 configured to define a cavity 30 or a space 300 therebetween that matches the first base 11 and the projection 2, the method including the steps of:
- providing at least one type of resin plate 4 including the first thermoplastic resin as a main component of the resin plate 4 and having a layered structure including a plurality of layers of reinforcement fiber to be the first reinforcement fiber F2 and/or the second reinforcement fiber F1;
- placing the resin plate 4 on one of the first and second molds 31 and 32;
- heating the at least one type of resin plate 4;
- clamping together the first mold 31 and the second mold 32; and
- opening the first mold 31 and the second mold 32 which have been clamped together.

Here, the step of heating the at least one type of resin plate 4 can be carried out by one of the following approaches (1) to (3), for example:
(1) placing the resin plate 4 on one of the first and second molds 31 and 32 and then heating the resin plate 4 through the one of the molds;
(2) placing the resin plate 4 on one of the first and second molds 31 and 32 and then heating the resin plate 4 by means of a heater, hot air, etc., or heating the resin plate 4 by means of a heater, hot air, etc., and then placing the resin plate 4 on one of the first and second molds 31 and 32; and
(3) a combination of (1) and (2) above.

With this method, as the resin plate is heated by one or both of the molds and/or a heater, or the like, and the resin plate is pressed and softened by both molds to give the resin plate some fluidity, the resin plate is deformed in conformity with the shape of the cavity, thereby filling the inside of the cavity. Alternatively, the resin plate is squashed in the space between both molds and deformed in conformity with the shape of the molds. At this time, the first thermoplastic resin of the resin plate flows into a concave (depression), which is a cavity or a space, that corresponds to a projection, and some layers of reinforcement fiber move into the concave. Therefore, the layers of reinforcement fiber will be oriented while being bent from the first base toward the projection.

Preferably, the method includes providing the at least one type of resin plate 4 including, as a main component of the resin plate 4, the first thermoplastic resin and having, as the layered structure, a layered structure of at least four layers of reinforcement fiber oriented in different directions from each other.

In such a case, four layers of reinforcement fiber that are oriented in different directions from each other will be buried in the first base.

The resin plate 4 having a predetermined planar shape and having different layered structures of reinforcement fiber for different areas is provided as the at least one type of resin plate 4. Note that a preform is preferably used as the resin plate 4. Herein, a preform is a material that is pre-shaped in order to achieve a molded shape with a high precision.

With such a resin plate, since the layered structure of reinforcement fiber varies for different areas, the reaction force of the flow acting upon reinforcement fiber in the molten matrix resin will be small.

Preferably, the providing step includes providing, as the at least one type of resin plate 4, a resin plate 4 whose thickness T is 0.5 to 10 mm.

When the thickness of the resin plate is smaller than 0.5 mm, the matrix resin is unlikely to flow across the entirety of the cavity. Particularly, the matrix resin and the reinforcement fiber will be unlikely to flow into the concave corresponding to the projection.

On the other hand, when the thickness of the resin plate 4 is greater than 10 mm, the thickness of the sole will be excessive.

In view of the above, the thickness of the resin plate 4 is more preferably 0.6 to 7.0 mm, and most preferably 1.0 to 5.0 mm.

Preferably, the providing step includes providing the at least one type of resin plate 4, wherein the number of layers of reinforcement fiber of the resin plate 4 is four to fifty.

In such a case, a first base of a multi-layer structure will likely be obtained.

Preferably, the providing step includes providing the at least one type of resin plate 4, wherein a length L of the reinforcement fiber of the resin plate 4 is shorter than one side of the resin plate 4.

In such a case, the length of the reinforcement fiber is shorter than one side of the resin plate 4. Therefore, the fluidity of the reinforcement fiber will be unlikely to be hindered. Thus, the reinforcement fiber will be likely to flow into the area corresponding to the projection.

Preferably, the step of providing the at least one type of resin plate 4 includes providing the resin plate 4, wherein a length L of the reinforcement fiber of the resin plate 4 is 5 to 60 mm.

In such a case, the length of the reinforcement fiber is short, and the flow of the reinforcement fiber will be even better.

Preferably, the method further includes the step of molding (forming) the second base 12 including the first or second thermoplastic resin as a main component of the second base 12.

In such a case, resins and reinforcement fiber can be selectively arranged depending on the area of the sole.

Preferably, the method includes:
- a first input step of inputting a thermoplastic resin piece 41 including the reinforcement fiber F to a concave 35 corresponding to the projection 2 in the cavity 30 or the space 300; and
- a second input step of, after the first input step, inputting the at least one type of resin plate 4 to an area corresponding to the first base 11 in the cavity 30 or the space 300.

In such a case, a resin piece different from the resin plate is input to the concave. Therefore, it is easy to realize a state where the reinforcement fiber has moved into the projection.

Preferably, the method further includes the step of heating the resin piece 41 before or after the first input step and before the second input step.

In such a case, it is possible to use the resin piece 41 that is longer than the depth of the concave, and the certainty to obtain the second reinforcement fiber will increase significantly.

Any feature illustrated and/or depicted in conjunction with one of the aforementioned aspects or the following embodiments may be used in the same or similar form in one or more of the other aspects or other embodiments, and/or may be used in combination with, or in place of, any feature of the other aspects or embodiments.

Embodiments

The present invention will be understood more clearly from the following description of preferred embodiments taken in conjunction with the accompanying drawings. Note however that the embodiments and the drawings are merely illustrative and should not be taken to define the scope of the present invention. The scope of the present invention shall be defined only by the appended claims. In the accompanying drawings, like reference numerals denote like components throughout the plurality of figures.

Embodiments of the present invention will now be described with reference to the drawings.

FIG. 1 to FIG. 3B show Embodiment 1 of a spike sole. FIG. 7 and FIG. 8 show an example of a method for manufacturing the spike sole.

Figure 1:
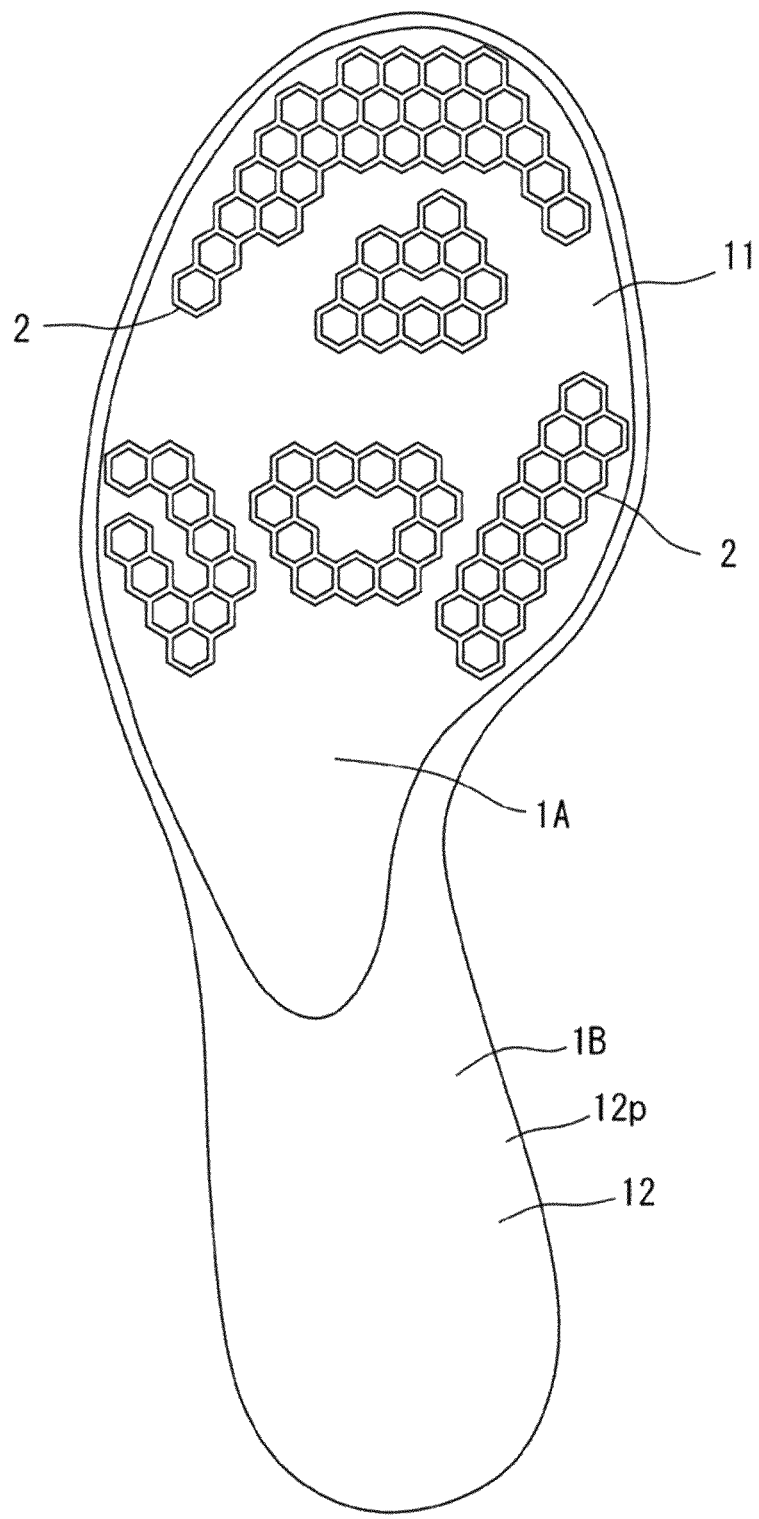
FIG. 1 is a bottom view showing one embodiment of a sole of a shoe to which the present invention is applied.

The present spike sole shown in FIG. 1 is a track-and-field spike sole, for example. The spike sole includes a hard sole body including a non-foamed resin component, and many spikes (an example of projections) 2 integrally and seamlessly molded (formed) with the sole body. Note that the sole body is formed from a first base 11 and a second base 12.

The present spike sole includes a first portion 1A and a second portion 1B.

As shown in FIG. 1 and FIG. 8(c), the first portion 1A includes the first base 11 and the projections 2, forming a forefoot portion, for example. On the other hand, the second portion 1B forms the periphery around the first portion 1A, the ground side surface and the rear foot portion. Note that the second portion 1B may be laminated on the surface of the first portion 1A on the ground side (FIG. 8(c)) and/or on the foot side (FIG. 14(c)).

The first portion 1A and the second portion 1B of the present embodiment of FIG. 1 include, as their main (primary) components, first and second thermoplastic resins, respectively. The first portion 1A includes, as a reinforcement material, the first and/or second reinforcement fiber F2, F1 of FIG. 3A in the matrix resin including the first thermoplastic resin.

Note that the matrix resin may include another thermoplastic resin other than the first thermoplastic resin.

Figure 2:
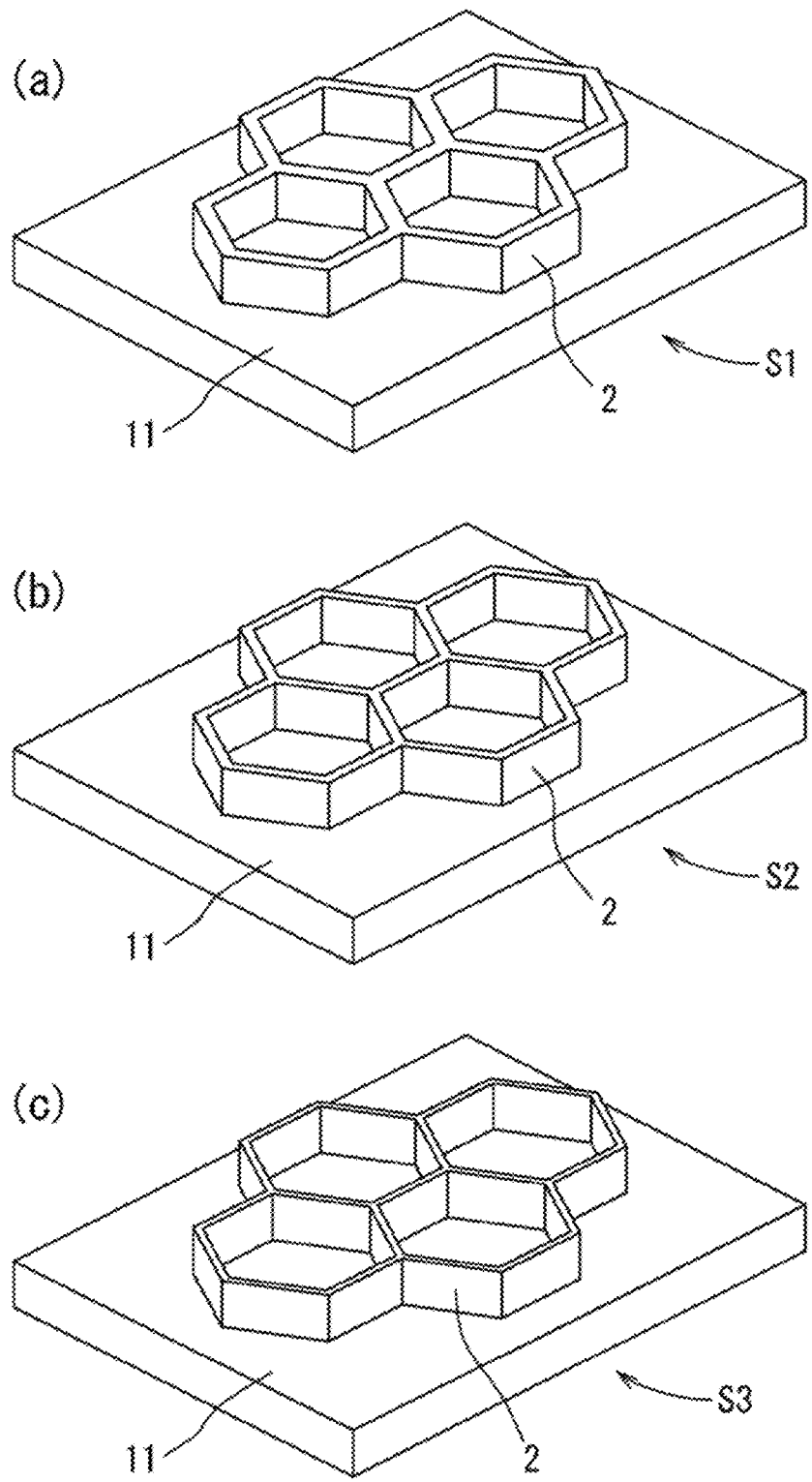
FIG. 2 is a partial perspective view showing examples of projections.

As shown in FIG. 2, the first portion 1A includes the first base 11 and the projections 2. The projections 2 project downward (upward in FIG. 2) from the first base 11 toward the road surface. The projections 2 extend seamless and integrally continuous from the surface of the first base 11.

Figure 3A:
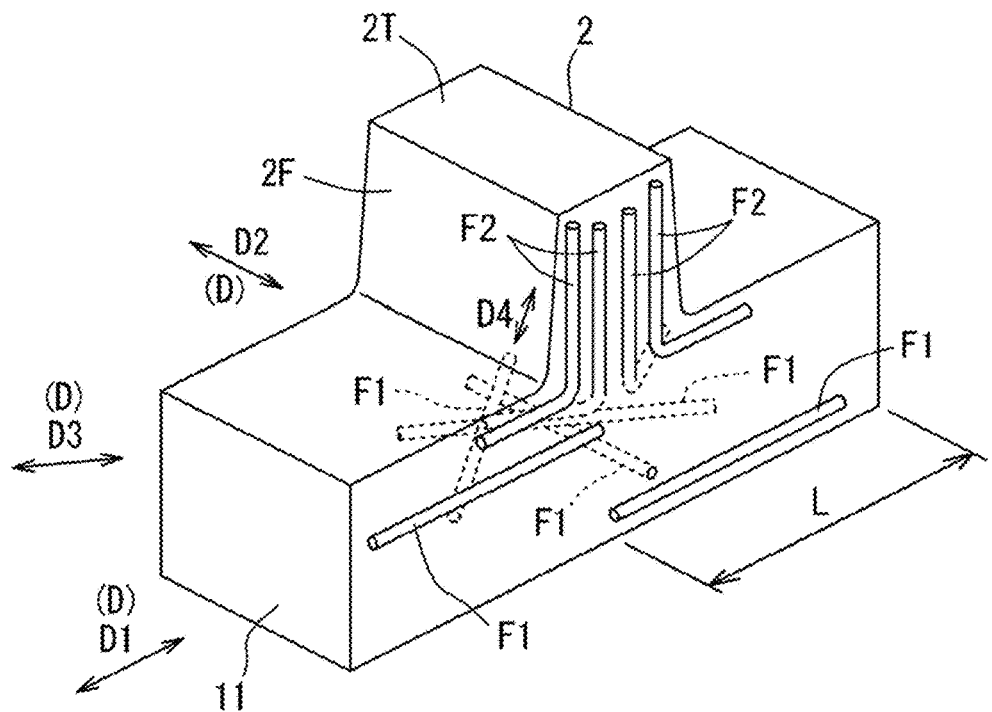
FIG. 3A is a schematic perspective view of a sole showing, in an enlarged cross section, the first base, a projection and first and second reinforcement fibers.
Figure 3B:
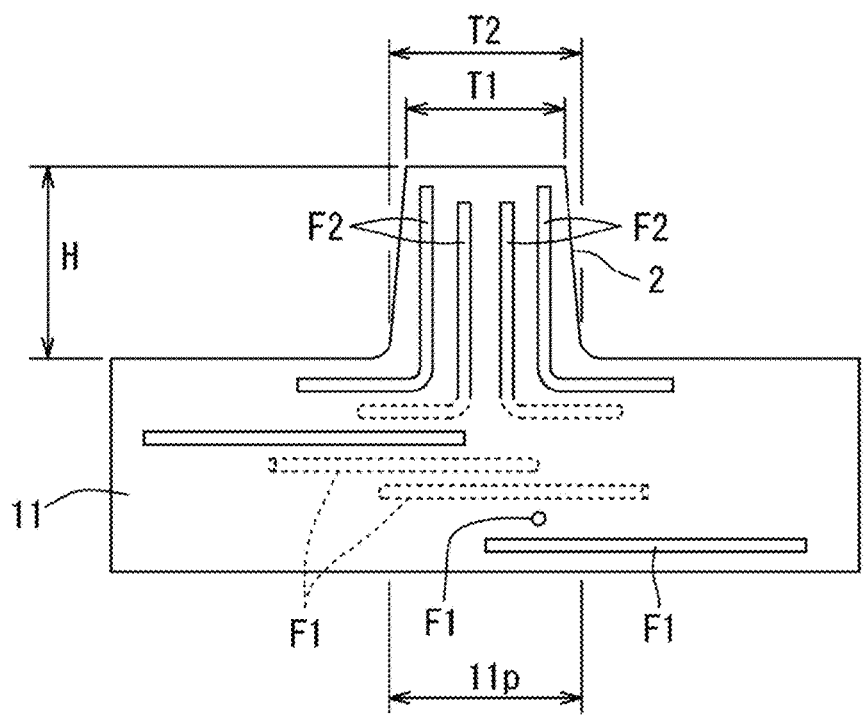
FIG. 3B is a schematic cross-sectional view showing the same. Although the first and second reinforcement fibers are arranged in layers, only one strand of each layer is shown for the sake of simplicity of the drawing and for ease of understanding of the invention.

As shown in FIG. 3A and FIG. 3B, the second reinforcement fiber F1 is buried in the first base 11. On the other hand, the first reinforcement fiber F2 is provided in the first base 11 and the projection 2 so as to be oriented—while being bent—from the first base 11 toward the projection 2.

Many, four to fifty, layers of the reinforcement fiber F1, F2, including the first reinforcement fiber F2, are buried at least in the first base 11 of FIG. 3B including a corresponding area 11p that corresponds to the projection 2. The many layers of the reinforcement fiber F1, F2 of FIG. 3A extend in the first base 11 including the corresponding area 11p in the direction in which the first base 11 extends, and are oriented in at least four different directions D1 to D4.

Note that FIG. 3A and FIG. 3B show a single strand of the first reinforcement fiber F2 or the second reinforcement fiber F1 for each layer of reinforcement fiber. For the sake of simplicity of the drawing, of the many strands of the reinforcement fibers F1 and F2, only five strands of the second reinforcement fiber F1 and only four strands of the first reinforcement fiber F2 are shown.

The length L of the first and second reinforcement fibers F2 and F1 of FIG. 3A may be set to about 20 to 30 mm, for example. The first and second reinforcement fibers F2 and F1 of such a fiber length can be obtained from a resin plate 4 of FIG. 5, which includes many resin pieces 41 of FIG. 4 aggregated and lying over one another, for example, as will be later described in detail.

The length L of the first reinforcement fiber F2 of FIG. 3A, which is about 20 to 30 mm, is typically greater than the height H of the projection 2 of FIG. 3B. The height H of the projection 2 means the amount by which it protrudes from the surface of the sole body 5.

The projections 2 may be spikes or cleats having a tubular shape of FIG. 2 and FIGS. 6(a) to 6(c), or those having a blade shape, a plate shape or a star shape of FIGS. 6(d), 6(e) and 6(f).

In FIG. 3B, the average thickness of the projection 2 may be set preferably to about 0.35 to 20 mm. The average thickness is obtained as the average value between the thickness T1 of the distal portion of the projection 2 and the thickness T2 of the proximal portion thereof. The thickness of the projection 2 may be tapered from the proximal portion toward the distal portion. Note that with the tubular shape of FIG. 2 and FIGS. 6(a) to 6(c), the thickness of the projection 2 means the wall thickness of the tubular portion, for example.

As shown in FIG. 1, the second portion 1B may be integrally molded (formed) with the first portion 1A having such a structure. That is, the second base 12 of FIG. 1 is arranged in a non-corresponding area 12p of FIG. 1, excluding the corresponding area 11p corresponding to the projection 2 of FIG. 3B. The second base 12 is continuous with the first base 11. The first base 11 and the second base 12 cover and support the sole of the foot.

Next, prior to the description of a method for manufacturing the spike sole of FIG. 1, the resin plate 4 to be used in the manufacture will be described.

The resin plate 4 of FIG. 5 includes many resin pieces 41 of FIG. 4 randomly aggregated and lying over one another. That is, each resin piece 41 is a piece of resin in which a single layer of a plurality of strands of the reinforcement fiber F is oriented, and the resin plate 4 of FIG. 5 is obtained by primary molding of such resin pieces 41 that are randomly aggregated and lying over one another into a square plate shape, for example.

After the sole is molded, the majority of the reinforcement fiber F of FIG. 4 becomes the second reinforcement fiber F1 of FIG. 3A while a portion thereof becomes the first reinforcement fiber F2.

That is, the resin plate 4 (FIG. 5) has a layered structure including a plurality of layers of the reinforcement fiber F of FIG. 4 to be the first or second reinforcement fiber F2, F1, and the main component thereof is the first thermoplastic resin. As the layered structure, the resin plate 4 (FIG. 5) has a layered structure of at least four layers of reinforcement fiber F of different orientation directions D.

The resin plate 4 (FIG. 5) has a predetermined planar shape, and has a layered structure of different reinforcement fibers F for different areas.

Note that the shape of the resin plate 4 (FIG. 5) may be a shape that is approximate to the shape of the first portion 1A of FIG. 1.

In FIG. 5, the thickness T of the resin plate 4 may be 0.5 to 10 mm. The number of layers of the reinforcement fiber F (FIG. 4) of the resin plate 4 may be four to fifty. The length L of the reinforcement fiber F of FIG. 4 of the resin plate 4 is shorter than one side of the resin plate 4 (FIG. 5), and may be 5 to 60 mm, for example.

Next, an example of molds (dies) to be used in the present embodiment will be described.

In the present embodiment, the first to fourth molds 31 to 34 of FIG. 7 and FIG. 8 are used as molds.

The first and second molds 31 and 32 of FIG. 7 are for molding (forming) the first portion 1A. The first and second molds 31 and 32 define a cavity 30 that matches the first base 11 and the projections 2. Note that the first and second molds 31 and 32 may have a protruding surface corresponding to the cavity 30.

The third and fourth molds 33 and 34 of FIG. 8 are for integrally molding (forming) the second portion 1B together with the first portion 1A. The third and fourth molds 33 and 34 have a cavity 36 that matches the second base 12 and an attachment portion 37 of the first portion 1A.

As the method for molding the first portion 1A of FIG. 7, a press molding method, for example, is preferred because the matrix resin is likely to move into the projection 2 and reach the distal portion of the projection 2. However, a vacuum molding method, a pressure forming method or a vacuum and pressure forming method may be employed.

On the other hand, an injection molding method, for example, may be employed as the method for integrally molding the second portion 1B of FIG. 8 together with the first portion 1A.

Next, an example of a manufacturing method will be described.

First, a method for manufacturing the first portion 1A will be described.

In FIG. 7(a), the first and second molds 31 and 32 are pre-heated or heated to a predetermined temperature. The resin plate 4 is placed on one of the first and second molds 31 and 32, e.g., on the lower mold.

After the placement, the first and second molds 31 and 32 are heated so that the temperature of the molds and the resin plate 4 reach a predetermined temperature, e.g., about 150° C. to 300° C. After the temperature of the molds increases to the predetermined temperature, the molds continue to be heated for a predetermined period of time, e.g., 1 second to about 30 minutes.

Thus, the resin plate 4 softens or melts to a state where it has a sufficient fluidity that allows for molding of the resin plate 4.

Then, as shown in FIG. 7(b), the first mold 31 and the second mold 32 are clamped together so that the first mold 31 and the second mold 32 meet each other. The resin plate 4 having melted becomes a molten resin 4M and spreads to fill up the cavity 30 by the clamping, and moves (flows) into portions that correspond to the first base 11 and the projections 2.

Note that the pressure for the clamping may be about 0.1 MPa to 10 MPa, for example.

Then, while being clamped, the molds 31 and 32 are allowed to cool down for a predetermined period of time, e.g., about 1 minute to 15 minutes. Thus, the molten resin 4M is cooled and solidified to produce the first portion 1A.

After the cooling, the first and second molds 31 and 32 clamped together of FIG. 7(b) are opened as shown in FIG. 7(c). After the opening, the first portion 1A is taken out of the molds, and burrs (fins), etc., are removed as necessary as well known in the art.

Next, a method for manufacturing the second portion 1B including the second base 12 of FIG. 8 will be described.

First, as shown in FIG. 8(a), the first portion 1A is attached to the attachment portion 37 of one of the third and fourth molds 33 and 34.

Next, as shown in FIG. 8(b), the third and fourth molds 33 and 34 are clamped together. After clamping, a molten resin 6M is supplied into the cavity 36 between the third and fourth molds 33 and 34.

After the molten resin 6M solidifies, the third and fourth molds 33 and 34 are opened as shown in FIG. 8(c). Then, the molded product is taken out and finished to obtain the spike sole of FIG. 1, for example.

Note that the first portion 1A may be provided not only on a portion of the sole but across the entire length of the sole. The second portion 1B may be absent. A third portion may be provided in addition to the first portion 1A and the second portion 1B.

Next, another example of the manufacturing method will be described.

In the present embodiment, the first to fourth molds 31 to 34 of FIG. 13 and FIG. 14 are used as molds.

First, a method for manufacturing the first portion 1A will be described.

In FIG. 13(a), the first and second molds 31 and 32 are pre-heated or heated to a predetermined temperature. The resin plate 4 is placed on one of the first and second molds 31 and 32, e.g., on the lower mold.

After the placement, the first and second molds 31 and 32 are heated so that the temperature of the molds and the resin plate 4 reach a predetermined temperature, e.g., about 150° C. to 300° C. After the temperature of the molds increases to the predetermined temperature, the molds continue to be heated for a predetermined period of time, e.g., 1 second to about 30 minutes.

Thus, the resin plate 4 softens or melts to a state where it has a sufficient fluidity that allows for molding of the resin plate 4.

Then, as shown in FIG. 13(b), the first mold 31 and the second mold 32 are clamped together so that the first mold 31 and the second mold 32 come close to each other or meet each other. The resin plate 4 having softened or melted becomes a molten resin 4M and is squashed in a space 300 between the molds 31 and 32 by the clamping so that a portion thereof spreads along the molds 31 and 32 to be the first base 11 while the other portions move (flow) into portions that correspond to the projections 2.

Note that protruding portions to be in contact with the first mold 31 upon clamping may be provided on the opposite sides of the second mold 32, for example.

Note that the pressure for the clamping may be about 0.1 MPa to 10 MPa, for example.

Then, while being clamped, the molds 31 and 32 are allowed to cool down for a predetermined period of time, e.g., about 1 minute to 15 minutes. Thus, the molten resin 4M is cooled and solidified to produce the first portion 1A.

After the cooling, the first and second molds 31 and 32 clamped together of FIG. 13(b) are opened. After the opening, the first portion 1A of FIG. 13(c) is taken out of the molds, and burrs, etc., are removed as necessary as well known in the art.

Next, a method for manufacturing the second portion 1B including the second base 12 of FIG. 14 will be described.

First, as shown in FIG. 14(a) and FIG. 14(b), the first portion 1A is attached to the attachment portion (cavity) 37 of the third mold 33 or the fourth mold 34.

Next, another resin plate 49 or the resin plate 4 is arranged in the cavity 36 between the third mold 33 and the fourth mold 34. The other resin plate 49 may be a thermoplastic resin of the same type as or a different type from the resin plate 4, and may include the second reinforcement fiber buried therein.

Then, as shown in FIG. 14(b), the third and fourth molds 33 and 34 are clamped together. Note that the pressure for the clamping may be about 0.1 MPa to 10 MPa, for example.

Before or after the clamping, the third and fourth molds 33 and 34 are heated so that the molds and the resin plate 4, 49 reach a predetermined temperature, e.g., about 150° C. to 300° C. Thus, the resin plate 4, 49 softens or melts to be seamless and continuous in the cavity 36 between the third and fourth molds 33 and 34.

Then, while being clamped, the molds 33 and 34 are allowed to cool down for a predetermined period of time, e.g., about 1 minute to 15 minutes. Thus, the resin plate 4, 49 is cooled and solidified to produce the second portion 1B.

After the resin plate is solidified, the third and fourth molds 33 and 34 of FIG. 14(b) are opened. Then, the molded product of FIG. 14(c) is taken out and finished to obtain the spike sole of FIG. 1, for example.

Note that the first portion 1A may be provided not only on a portion of the sole but across the entire length of the sole. The second portion 1B may be absent. A third portion may be provided in addition to the first portion 1A and the second portion 1B.

Next, an example of an additional manufacturing method will be described with reference to FIG. 9.

In the example of FIG. 9, the resin piece 41 is used alone, in addition to the resin plate 4, 49. The resin piece 41 is formed from a first thermoplastic resin including the reinforcement fiber F.

As shown in FIG. 9(a), a first input step is performed by inputting the thermoplastic resin piece 41 including the reinforcement fiber F into concaves 35 that correspond to the projections in the cavity 30 (FIG. 7) or the space 300 (FIG. 13). At this time, the resin piece 41 is input into the concaves 35 so that a portion of the reinforcement fiber F moves into the concaves 35 while the rest of the reinforcement fiber F protrudes from the concave 35.

On the other hand, before and after the first input step, a heating step of heating the resin piece 41 is performed. With this heating, the resin piece 41 softens to be moldable as shown in FIG. 9(b).

After the first input step and the heating step, a second input step is performed by inputting the resin plate 4 of FIG. 9(c) to an area of the cavity 30 of FIG. 7(a) or the space of FIG. 13 that corresponds to the first base 11.

After the second input step, the steps of FIGS. 7(a) to 7(c) or the steps of FIGS. 13(a) to 13(c) are performed, thereby producing the first portion 1A.

Next, an example test of the present spike sole will be described.

By a method similar to the method of FIG. 7 described above, first to third samples S1 to S3 in which the projections 2 are integral with the first base 11 were obtained as shown in FIGS. 2(a) to 2(c). Next, these samples were cut along a vertical cross section, and digital pictures of the cross sections were taken, obtaining cross-section pictures as shown in FIG. 10 to FIG. 12.

In these figures, 11F is the surface of the first base 11, 2F is the side surface of the projection 2, and 2T is the top surface of the projection 2.

In FIG. 10 to FIG. 12, it can be seen that it is possible to perform a molding process such that a matrix resin including the first thermoplastic resin moves into the projections 2. It can also be seen that the first reinforcement fiber F2, which is a part of the reinforcement fiber, is oriented while being bent from the first base 11 toward the projection 2.

Now, it can be seen that the orientation of the first reinforcement fiber F2 is better in the case of FIG. 10 (first sample) where the thickness of the projection 2 is 0.4 mm, as compared with the case of FIG. 12 where it is 0.2 mm or the case of FIG. 11 where it is 0.3 mm. Thus, the thickness of the projection 2 is preferably 0.35 mm or more.

While preferred embodiments have been described above with reference to the drawings, various obvious changes and modifications will readily occur to those skilled in the art upon reading the present specification.

For example, spikes (projections) may be provided in the rear foot portion, in addition to the forefoot portion.

Small projections or cleats may be provided instead of spikes.

Thus, such changes and modifications are deemed to fall within the scope of the present invention.

INDUSTRIAL APPLICABILITY

The present invention is applicable to track-and-field spike soles and shoe soles, as well as other spike soles and shoe soles for baseball, football, etc.

REFERENCE SIGNS LIST

1A: First portion, 1B: Second portion
11: First base, 11F: Surface, 12: Second base
11p: Corresponding area, 12p: Non-corresponding area
2: Projection, 2F: Side surface, 2T: Top surface
30: Cavity, 31: First mold (die), 32: Second mold (die), 33: Third mold (die), 34: Fourth mold (die), 35: Concave, 36: Cavity, 37: Attachment portion (cavity), 300: Space
4: Resin plate, 4M, 6M: Molten resin, 41: Resin piece
D: Orientation direction, D1 to D4: Four directions
F: Reinforcement fiber, F1: Second reinforcement fiber, F2: First reinforcement fiber
H: Height, L: Length, T: Thickness of resin plate, T1, T2: Thickness of projection
S1 to S3: First to third samples

The invention claimed is:
1. A sole of a shoe comprising:
a first base including as its main component a first thennoplastic resin;
a projection including as its main component the first thermoplastic resin, the projection projecting from the first base, wherein the projection is tapered from a proximal portion of the projection at the first base toward a distal portion of the projection, such that a thickness of the distal portion of the projection is less than a thickness of the proximal portion of the projection;
at least one first reinforcement fiber is provided in the first base and the projection so as to be oriented while being bent from the first base toward the projection, wherein a length of the first reinforcement fiber is greater than a height of the projection; and a second base including as its main component a second thermoplastic resin that is different from the first thermoplastic resin.

2. The sole of a shoe according to claim 1, further comprising at least one second reinforcement fiber buried in the first base.

3. The sole of a shoe according to claim 1, wherein:
at least four first reinforcement fibers are buried at least in a corresponding area of the first base that corresponds to the projection; and
at least in the corresponding area, the at least four first reinforcement fibers extend in a direction in which the first base extends and are oriented in at least four different directions.

4. The sole of a shoe according to claim 3, wherein at least the second base is arranged in a non-corresponding area that is continuous with the first base and is an area other than the corresponding area.

5. The sole of a shoe according to claim 1, wherein:
four to fifty first reinforcement fibers are buried at least in a corresponding area of the first base that corresponds to the projection; and
at least in the corresponding area, the four to fifty first reinforcement fibers extend in a direction in which the first base extends and are oriented in at least four different directions.

6. The sole of a shoe according to claim 1, wherein the length of the first reinforcement fiber is 5 mm to 60 mm.

7. The sole of a shoe according to claim 1, wherein an average thickness of the projection is 0.35 to 20 mm.

8. The sole of a shoe according to claim 1, wherein the projection is a tubular, plate-shaped, star-shaped or blade-shaped spike or cleat.

* * * * *